(12) United States Patent
Bharucha et al.

(10) Patent No.: US 11,338,925 B2
(45) Date of Patent: May 24, 2022

(54) TELESCOPING ARM RESTRAINT SYSTEM

(71) Applicant: AMI Industries, Inc., Colorado Springs, CO (US)

(72) Inventors: Nicholas K Bharucha, Colorado Springs, CO (US); Steve Holstine, Colorado Springs, CO (US); Casey Andrew Stribrny, Colorado Springs, CO (US)

(73) Assignee: AMI Industries, INC., Colorado Springs, CO (US)

( * ) Notice: Subject to any disclaimer, the term of this patent is extended or adjusted under 35 U.S.C. 154(b) by 117 days.

(21) Appl. No.: 16/988,158

(22) Filed: Aug. 7, 2020

(65) Prior Publication Data

US 2022/0041291 A1 Feb. 10, 2022

(51) Int. Cl.
*B64D 25/10* (2006.01)
*B64D 25/04* (2006.01)

(52) U.S. Cl.
CPC ............. *B64D 25/10* (2013.01); *B64D 25/04* (2013.01)

(58) Field of Classification Search
CPC ........ B64D 25/02; B64D 25/04; B64D 25/10; B64D 25/12; B64D 11/0616; B64D 11/0689
See application file for complete search history.

(56) References Cited

U.S. PATENT DOCUMENTS

| 4,081,156 | A | | 3/1978 | Ideskar | |
|---|---|---|---|---|---|
| 4,215,835 | A | | 8/1980 | Wedgwood | |
| 4,359,200 | A | | 11/1982 | Brevard et al. | |
| 4,592,523 | A | * | 6/1986 | Herndon | B64D 25/02 244/122 AG |
| 4,667,902 | A | * | 5/1987 | Zenobi | B64D 25/02 244/122 A |
| 5,415,366 | A | * | 5/1995 | Mastrolia | B64D 25/02 244/122 AG |
| 5,732,907 | A | * | 3/1998 | Limbach | B64D 25/02 244/122 AG |
| 8,485,471 | B2 | * | 7/2013 | Patterson | B64D 25/10 244/122 AG |
| 2011/0114790 | A1 | * | 5/2011 | Patterson | B64D 25/02 244/122 AG |

FOREIGN PATENT DOCUMENTS

GB 2475371 5/2011

OTHER PUBLICATIONS

United Kingdom Intellectual Property Office, United Kingdom Search Report dated Sep. 30, 2021 in Application No. GB2111240.4.

* cited by examiner

*Primary Examiner* — Richard G Davis
(74) *Attorney, Agent, or Firm* — Snell & Wilmer L.L.P.

(57) ABSTRACT

An ejection seat is disclosed. In various embodiments, the ejection seat includes a seat frame having a seat-back and a seat-pan adapted to support an occupant, the ejection seat further comprising a propulsion system configured to propel the ejection seat from an aircraft; and a backstop configured to deploy laterally outward from the seat-back to form a forward-facing surface, the backstop including a lower support arm and an upper support arm, the lower support arm and the upper support arm configured to telescope upon deployment of the ejection seat.

20 Claims, 6 Drawing Sheets

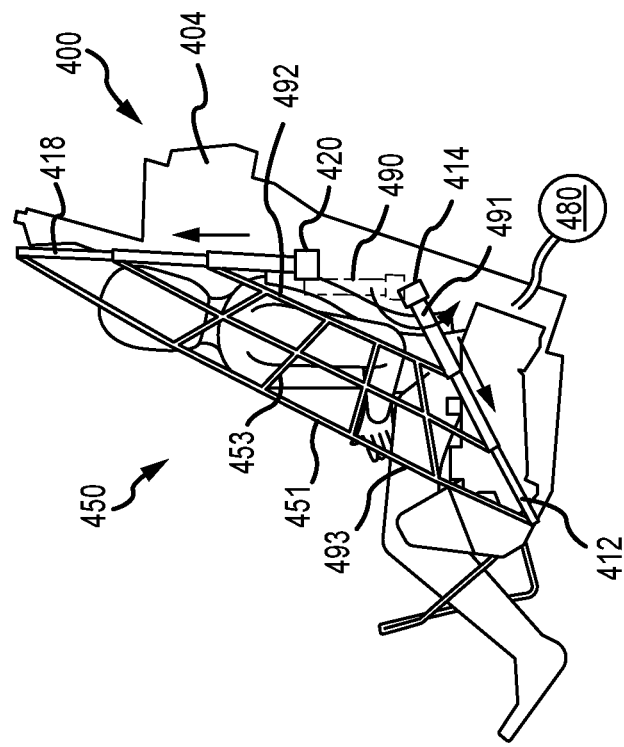
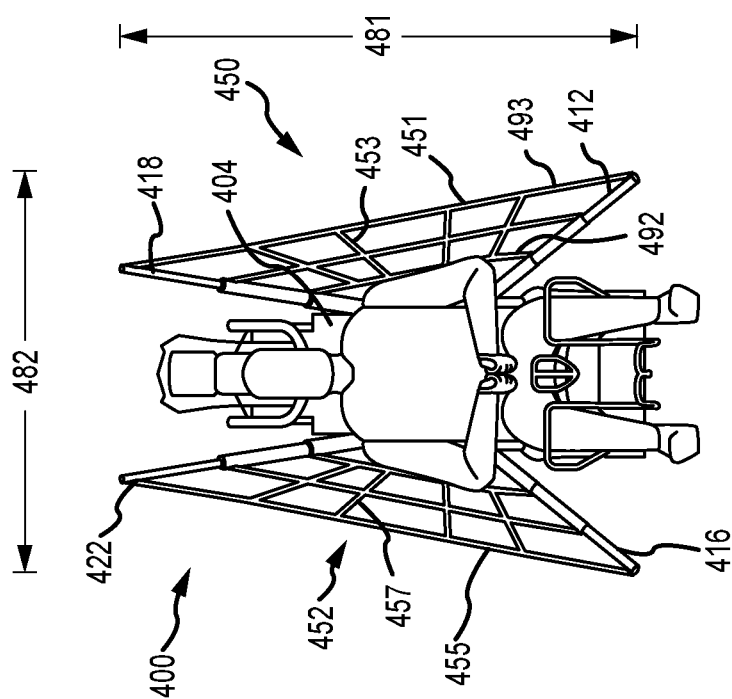

TELESCOPING ARM RESTRAINT SYSTEM

FIELD

The present disclosure relates to ejection seats and, more particularly, to ejection seats having arm restraint systems configured to increase lateral extension of a backstop following ejection from an aircraft.

BACKGROUND

Various aircraft include one or more ejection seats configured to eject a pilot or other occupant from the aircraft during an emergency. When a pilot or other occupant ejects from an aircraft moving at high speed relative to the surrounding air, the pilot or other occupant is quickly subjected to a high-speed windblast, resulting in extreme pressure-induced forces imposed on the pilot or other occupant and the ejection seat. These forces may cause the arms of the pilot or other occupant to flail about, thereby exposing the pilot or other occupant to injury unless constrained.

SUMMARY

An ejection seat is disclosed. In various embodiments, the ejection seat includes a seat frame having a seat-back and a seat-pan adapted to support an occupant, the ejection seat further comprising a propulsion system configured to propel the ejection seat from an aircraft; and a backstop configured to deploy laterally outward from the seat-back to form a forward-facing surface, the backstop including a lower support arm and an upper support arm, the lower support arm and the upper support arm configured to telescope in response to deployment of the ejection seat.

In various embodiments, the lower support arm includes a lower base member connected to the seat frame. In various embodiments, the lower support arm includes a first lower telescoping member slidably engaged with the lower base member. In various embodiments, the lower support arm includes a shear pin extending through the lower base member and the first lower telescoping member. In various embodiments, a ratcheting hinge connects the lower base member to the seat frame. In various embodiments, the ejection seat further includes a pressure source, the pressure source configured to telescope the first lower telescoping member from the lower base member in response to deployment of the ejection seat. In various embodiments, the lower support arm includes a second lower telescoping member slidably engaged with the first lower telescoping member.

In various embodiments, the upper support arm includes an upper base member connected to the seat frame. In various embodiments, the upper support arm includes a first upper telescoping member slidably engaged with the upper base member. In various embodiments, the upper support arm includes a second upper telescoping member slidably engaged with the first upper telescoping member. In various embodiments, a non-ratcheting hinge connects the upper base member to the seat frame.

An ejection seat for an aircraft is disclosed. In various embodiments, the ejection seat includes a seat frame having a seat-back and a seat-pan adapted to support an occupant; and a backstop configured to deploy laterally outward from the seat-back to form a forward-facing surface, the backstop including a lower support arm, the lower support arm configured to telescope in response to deployment of the ejection seat, an upper support arm, the upper support arm configured to telescope in response to deployment of the ejection seat, and a plurality of shrouds, the plurality of shrouds connected to the lower support arm and the upper support arm and configured to form the forward-facing surface in response to deployment of the ejection seat.

In various embodiments, the lower support arm includes a lower base member connected to the seat frame and a first lower telescoping member slidably engaged with the lower base member. In various embodiments, the plurality of shrouds in connected to the first lower telescoping member. In various embodiments, the lower support arm includes a second lower telescoping member slidably engaged with the first lower telescoping member. In various embodiments, the plurality of shrouds in connected to the second lower telescoping member. In various embodiments, the upper support arm includes an upper base member connected to the seat frame and a first upper telescoping member slidably engaged with the upper base member.

In various embodiments, the plurality of shrouds is connected to the first lower telescoping member and to the first upper telescoping member. In various embodiments, the upper support arm includes a second upper telescoping member slidably engaged with the first upper telescoping member and the lower support arm includes a second lower telescoping member slidably engaged with the first lower telescoping member and wherein the plurality of shrouds is connected to the second lower telescoping member and to the second upper telescoping member.

In various embodiments, the lower support arm includes a first shear pin extending through the lower base member and the first lower telescoping member and the upper support arm includes a second shear pin extending through the lower base member and the first lower telescoping member.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 4A and 4B provide schematic frontal and side views of an ejection seat having a telescoping arm restraint system, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
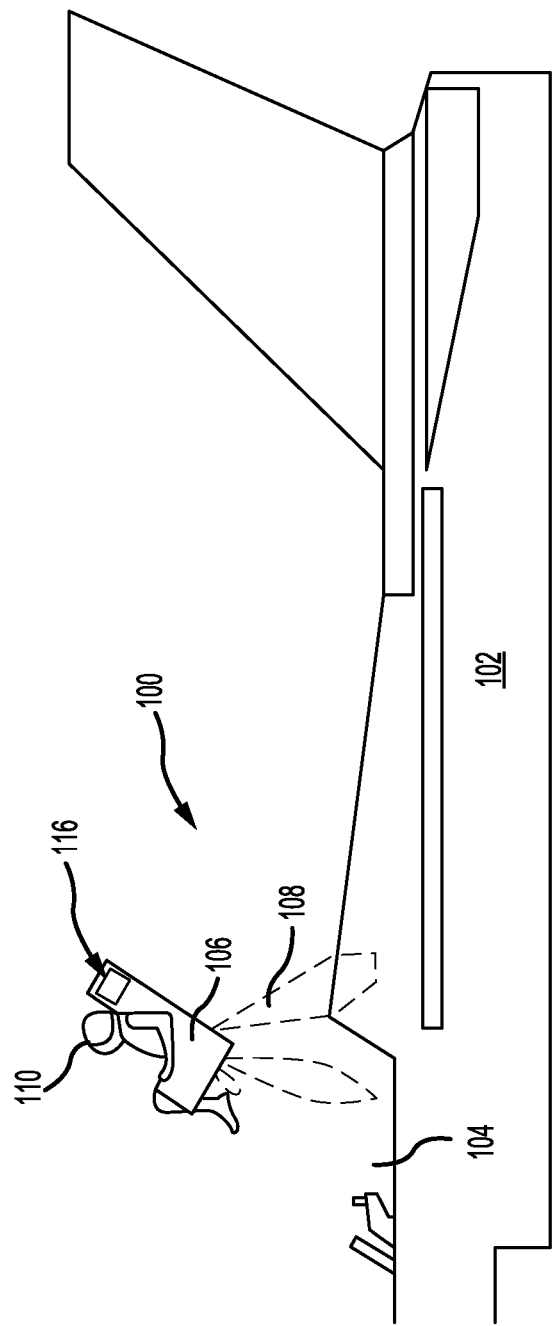
FIG. 1 illustrates an ejection seat being launched from an aircraft cockpit, in accordance with various embodiments.

With reference now to the drawings, FIG. 1, illustrates an aircraft ejection system 100, in accordance with various embodiments. The aircraft ejection system 100 may be installed in an aircraft 102 to safely expel an ejection seat 106 and an occupant 110 of the ejection seat 106 from a cockpit 104 of the aircraft 102. The ejection seat 106 may be urged from the cockpit 104 by a propulsion system 108. The aircraft ejection system 100 may include a parachute assembly 116. In various embodiments, prior to deployment of the parachute assembly 116, a portion of the parachute assembly 116 may be stored within the ejection seat 106.

Figure 2:
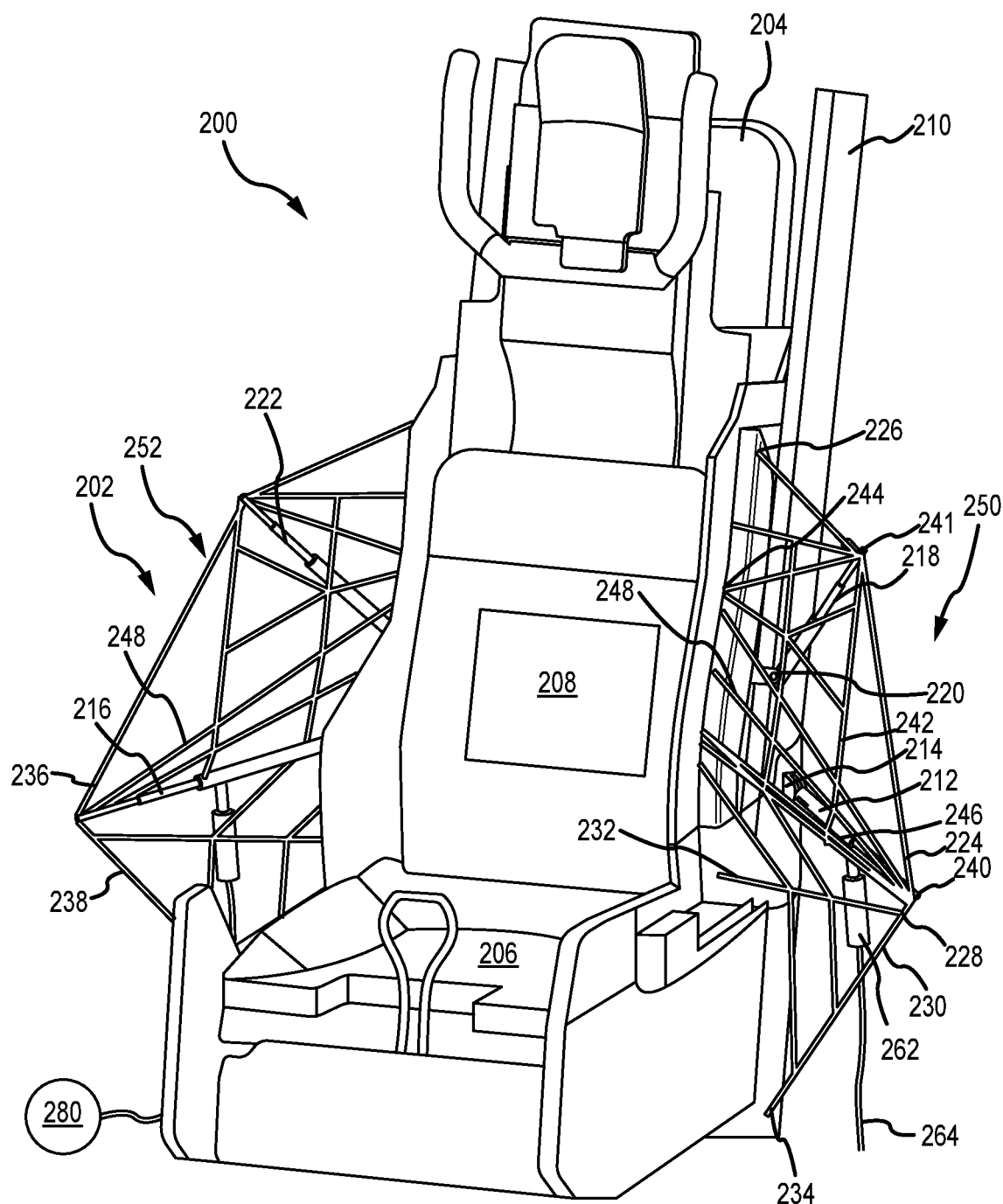
FIG. 2 provides a schematic view of an ejection seat having a telescoping arm restraint system, in accordance with various embodiments.

Referring now to FIG. 2, a schematic view of an ejection seat 200 having an arm restraint system 202 is provided, in accordance with various embodiments. The ejection seat 200 comprises a seat frame 204 having a seat-pan portion 206 and a seat-back portion 208. The seat frame 204 is formed of any suitable material, including, for example, aluminum alloys, titanium alloys or composite materials. The ejection seat 200 is launched by a propulsion system, including, for example, a catapult or a solid rocket motor, either or both of which is configured to propel the ejection seat 200 out of the aircraft along a launch rail 210. A first lower support arm 212 (or a left-side lower support arm) is attached to the seat frame 204 via a first ratcheting hinge 214, the purpose of which will be explained more fully below. Similarly, a second lower support arm 216 (or a right-side lower support arm) is attached to the seat frame 204 via a second ratcheting hinge (hidden). A first upper support arm 218 (or a left-side upper support arm) is attached to the seat frame 204 via a first non-ratcheting hinge 220. A second upper support arm 222 (or a right-side upper support arm) is similarly attached to the seat frame 204 via a second non-ratcheting hinge (hidden). The upper and lower support arms may be formed of any suitably strong, rigid and lightweight material, such as, for example, carbon fiber, titanium or aluminum alloy. Further, and as described further below, each of the upper and lower support arms comprises a telescoping construction that is configured to telescope outward from the seat frame 204 upon deployment. In various embodiments, a pressure source 280, which may be disposed internal or external to the ejection seat 200, is coupled to the upper and lower support arms and configured to telescope the support arms upon deployment of the ejection seat 200.

In various embodiments, a first primary cable 224 (or a left-side primary cable) is secured at a first end 226 (or an upper end) to the seat frame 204. A second end 228 (or a lower end) of the first primary cable 224 is spliced to a first lower support cable 230 (or a left-side lower support cable), which is secured to the seat frame 204 at a first end 232 and a second end 234. Similarly, a second primary cable 236 (or right-side primary cable) is secured at a first end (or an upper end) to the seat frame 204, while a second end (or a lower end) of the second primary cable 236 is spliced to a second lower support cable 238 (or a right-side lower support cable), which is secured to the seat frame 204 at a first end and a second end in a fashion similar to the first lower support cable 230.

In various embodiments, the first primary cable 224 is routed through an eye at a free end 240 of the first lower support arm 212 and through an eye located at a free end 241 of the first upper support arm 218. The second primary cable 236 is similarly routed through eyes in the free ends of the second lower support arm 216 and the second upper support arm 222. A first secondary cable 242 is secured to the seat frame 204 at an upper end 244. A lower end 246 of the first secondary cable 242 is attached to one of a plurality of tertiary cables 248 that run between the seat frame 204 and a plurality of eyes located at the free end 240 of the first lower support arm 212. A second secondary cable (or right-side secondary cable) is of substantially identical construction and connection as the first secondary cable 242. As illustrated in FIG. 2, the cables discussed hereinbefore form a first backstop 250 (or a left-side backstop) in the form of a first net and a second backstop 252 (or a right-side backstop) in the form of a second net, each being comprised of a plurality of relatively small-diameter shrouds that would cause little wind resistance as compared with the relatively large-diameter shrouds comprised within the first primary cable 224 and the second primary cable 236. In various embodiments, an attenuator 262 is attached to the first lower support arm 212 and triggered via a deployment cable 264, which is attached to an anchor secured to the aircraft frame.

The cables (or the plurality of shrouds) forming the first backstop 250 and the second backstop 252 may be of any suitable material having sufficiently low elongation or stretch such that the force of an occupant's arm striking a backstop does not deform the backstop a sufficient distance for the occupant's arms to impact one of the upper or lower support arms. In various embodiments, for example, the cables and shrouds may comprise a woven aramid fiber (e.g., Kevlar®) having an elongation not greater than approximately five percent (5%). The length of the cables and shrouds are selected such that as the support arms deploy, the cables are tensioned to approximately two hundred pound-force (200 lbf≈890 N) such that upon impact with a $90^{th}$ percentile occupant's arms at 600 knots, the backstop elastically deforms and recovers, in various embodiments, no more than 3 inches 7.62 cm) or, in various embodiments, between 1-2 inches 2.54-5.08 cm) or, in various embodiments, approximately one inch 2.54 cm) at its maximum deflection.

Figure 3A:
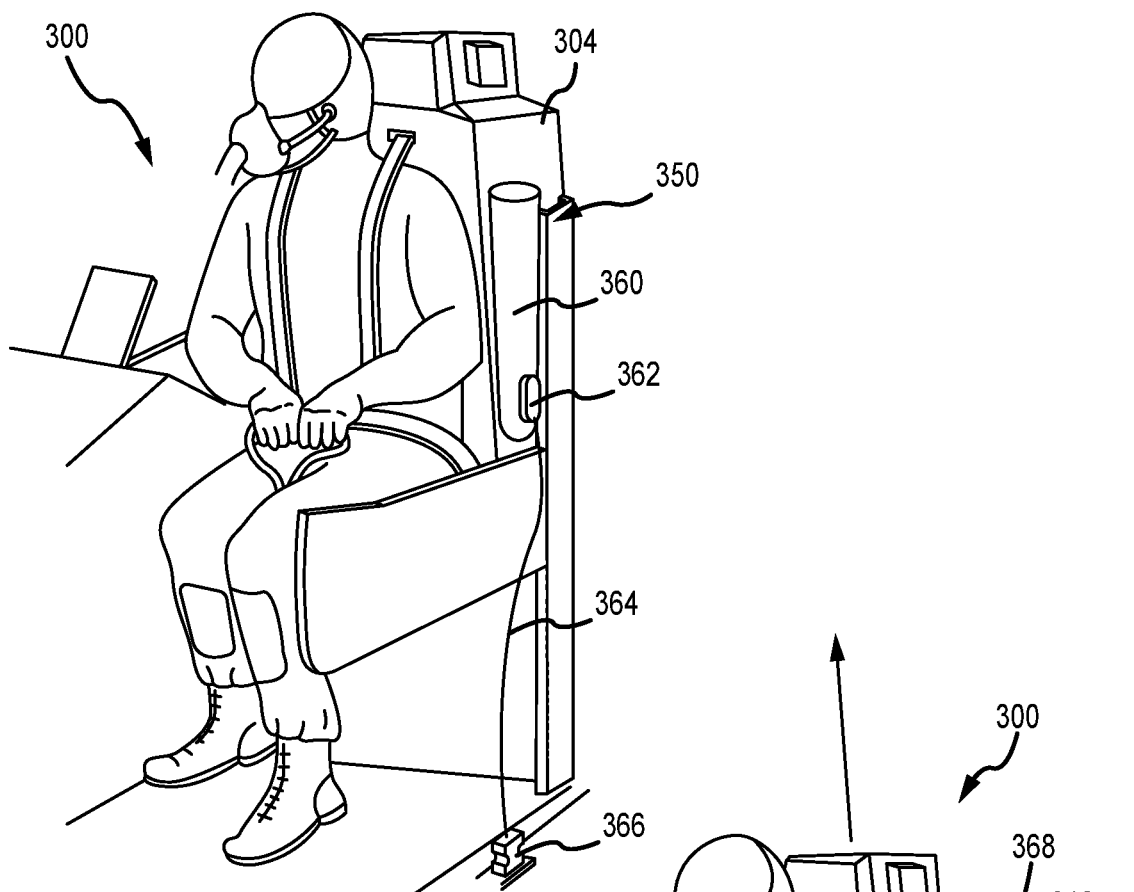
FIGS. 3A, 3B and 3C provide schematic views of an ejection seat having a telescoping arm restraint system undergoing an ejection sequence or operation, in accordance with various embodiments.
Figure 3B:
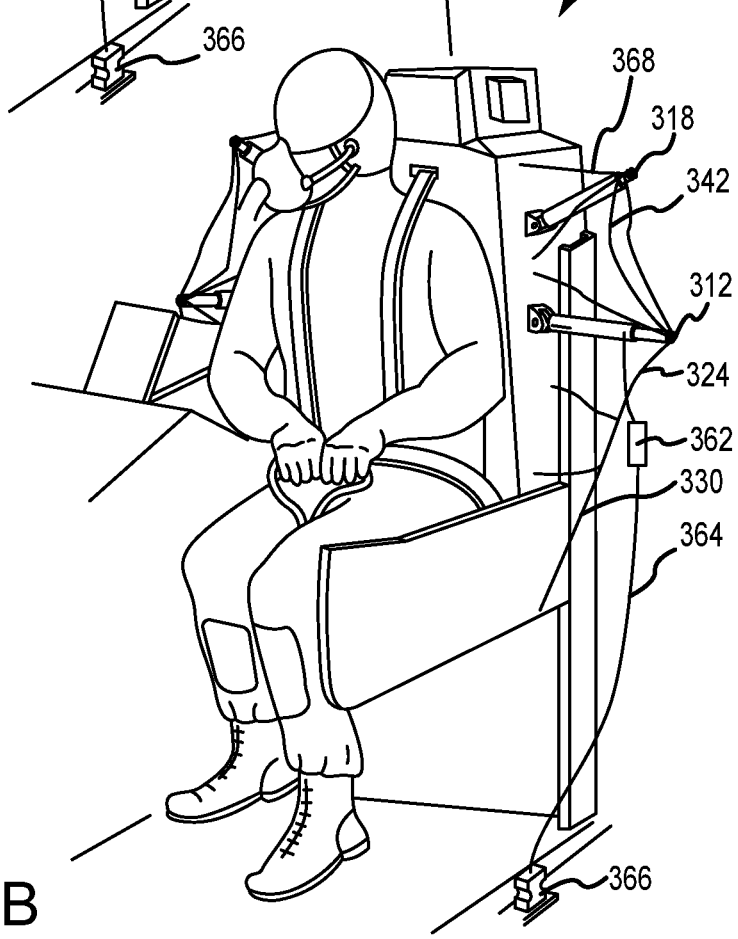
Figure 3C:
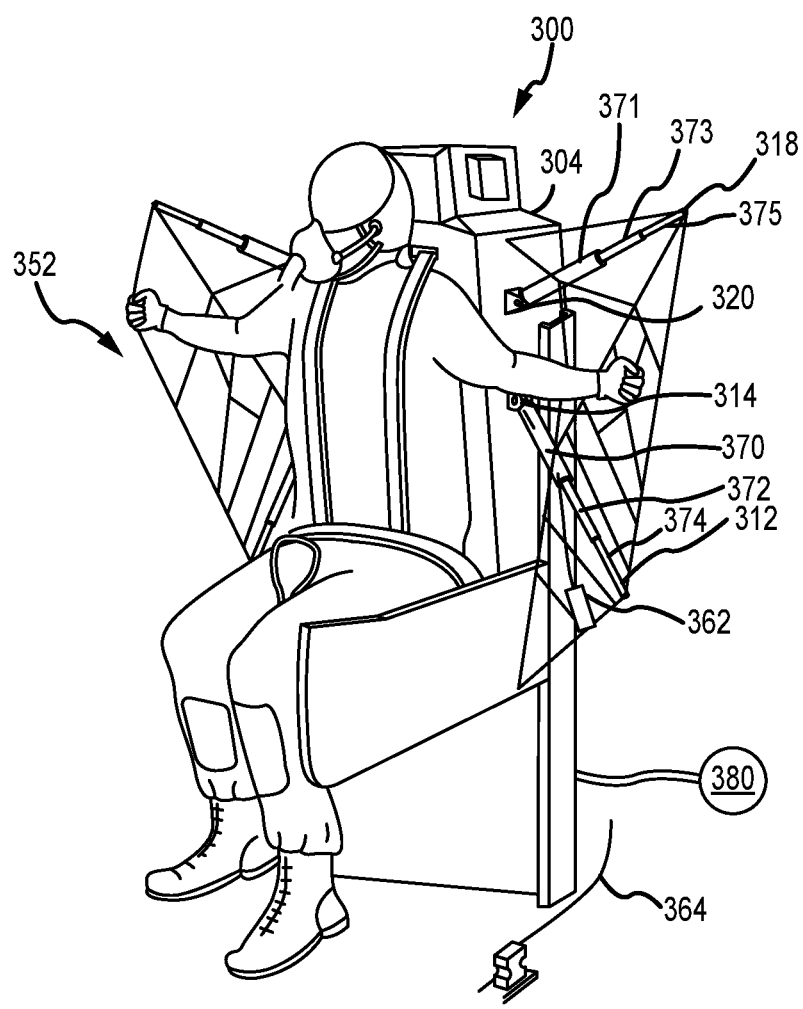

Referring now to FIGS. 3A, 3B and 3C, a description of the operation of an ejection seat 300, similar to the ejection seat 200 described above, is provided. With reference to FIG. 3A, a first backstop 350 is shown in its undeployed condition with a lower support arm 312 and an upper support arm 318 folded against a seat frame 304 and stored within a container 360. An attenuator 362 is attached to the lower support arm 312 and is triggered via a deployment cable 364, which is attached to an anchor 366 secured to the aircraft frame. As shown in FIG. 3B, as the ejection seat 300 is propelled out of the aircraft, the attenuator 362 pulls the lower support arm 312 out of the container 360 and along with it a primary cable 324 and the remaining components of the first backstop 350. A cable stop 368 (or a splice of similar device) is attached to the primary cable 324 at a predetermined location. As the lower support arm 312 is deployed by the attenuator 362 (after being triggered by the deployment cable 364), the upper support arm 318 is also deployed until halted by the cable stop 368. This method of deployment causes the primary cable 324 and a lower support cable 330 to tension before a secondary cable 342. Thus, the section below the lower support arm 312 is fully tensioned when the lower support arm 312 is at an angle of between about ten degrees (10°) above or below the horizontal while the section above the lower support arm 312 is fully tensioned when the lower support arm 312 is at an angle of between about twenty degrees)(20°) below or above the horizontal (relative to the seat-back). A second backstop 352 on the right side of the ejection seat 300 is deployed in similar fashion.

As show in FIG. 3C, as the ejection seat 300 exits the aircraft, the deployment cable 364 continues to pull the lower support arm 312 downward, thereby tensioning the cables that form the first backstop 350. At a predetermined tension, a rip stitch in the attenuator 362 fractures, allowing the deployment cable 364 to separate from the attenuator 362. The ratcheting hinge 314, attaching the lower support arm 312 to the seat frame 304, then locks the lower support arm 312 in position against the tension of the primary, the secondary and the tertiary cables. As the ejection seat 300 enters the windblast, the occupant's arms flail backwards until they impact the first backstop 350 and the second backstop 352, each of which provides a forward-facing surface configured to safely arrest the rearward motion of the occupant's arms.

As may be seen from the various drawings, although the first backstop 350 and the second backstop 352 deploy outward, they do not deploy perpendicular to the forward direction of ejection seat 300, but are deployed forward approximately fifteen degrees (15°) from the perpendicular. Accordingly, the disclosure is not intended to be limited to a backstop in which the entirety of the structure is rearward of the occupant. Any structure in which the occupant's arms are allowed to intentionally flail backwards until the rearward motion is arrested by a backstop with the occupant's arms at a sufficiently oblique angle to the windblast that the windblast itself holds the occupant's arms safely against the backstop is considered within the scope of the disclosure. Accordingly, although in the illustrative embodiments the forward angles of the backstops are approximately fifteen degrees, a forward deployment angle of zero up to thirty, thirty-five or even forty degrees forward of the perpendicular is considered within the scope of the disclosure.

Referring still to FIG. 3C, upon deployment of the ejection seat, each of the upper and lower support arms telescopes outward, typically in response to an input of pressurized gas into the upper and lower support arms. In various embodiments, for example, the lower support arm 312 comprises a base member 370 (or a lower base member) connected to a ratcheting hinge 314, a first telescoping member 372 (or a first lower telescoping member) slidably engaged with the base member 370 and a second telescoping member 374 (or a second lower telescoping member) slid- ably engaged with the first telescoping member 372. As described above, upon deployment, a pressure source 380, which may be disposed internal or external to the ejection seat 300, is activated to pressurize the lower support arm 312, thereby causing the first telescoping member 372 to slide (or telescope) outwardly from the base member 370 and the second telescoping member 374 to slide (or telescope) outwardly from the first telescoping member 372. Similarly, the upper support arm 318 comprises a base member 371 (or an upper base member) connected to a non-ratcheting hinge 320, a first telescoping member 373 (or a first upper telescoping member) slidably engaged with the base member 371 and a second telescoping member 375 (or a second upper telescoping member) slidably engaged with the first telescoping member 373. Upon deployment, the pressure source 380 pressurizes the upper support arm 318, thereby causing the first telescoping member 373 to slide (or telescope) outwardly from the base member 371 and the second telescoping member 375 to slide (or telescope) outwardly from the first telescoping member 373. The first backstop 350 and the second backstop 352 (which deploys in similar fashion) are fully deployed upon the lower support arm 312 and the upper support arm 318 having been rotated into position (as described above) and assume their fully telescoped positions.

Referring now to FIGS. 4A and 4B, an ejection seat 400, similar to the ejection seat 300 described above, is illustrated in a deployed position, in accordance with various embodiments. Similar to the various embodiments described above, the ejection seat 400 includes a seat frame 404 having a seat-pan portion and a seat-back portion. A first lower support arm 412 (or a left-side lower support arm) is attached to the seat frame 404 via a first ratcheting hinge 414. Similarly, a second lower support arm 416 (or a right-side lower support arm) is attached to the seat frame 404 via a second ratcheting hinge (hidden). A first upper support arm 418 (or a left-side upper support arm) is attached to the seat frame 404 via a first mount 420. A second upper support arm 422 (or a right-side upper support arm) is similarly attached to the seat frame 404 via a second mount (hidden). In various embodiments, both the first mount 420 and the second mount are fixed mounts, thereby preventing the first upper support arm 418 and the second upper support arm 422 from rotating or pivoting with respect to the seat frame 404. Similar to the description above, each of the upper and lower support arms comprises a telescoping construction that is configured to telescope outward from the seat frame 404 upon deployment. In various embodiments, a pressure source 480, which may be disposed internal or external to the ejection seat 400, is coupled to the upper and lower support arms and configured to telescope the support arms upon deployment of the ejection seat 400.

Still referring to FIGS. 4A and 4B, upon deployment, the pressure source 480 is activated, causing the first lower support arm 412 and the second lower support arm 416 to rotate from a retracted position 490 to a deployed position 491. At the same time, each of the first lower support arm 412, the second lower support arm 416, the first upper support arm 418 and the second upper support arm 422 telescope to their fully deployed positions. In various embodiments, the base members of the first upper support arm 418 and the second upper support arm 422 (e.g., the base member 371 illustrated at FIG. 3C) are fixed with respect to the seat frame 404, thereby constraining the upper support arms to telescope in fixed directions without rotation. Once the support arms are deployed, a first backstop 450 and a second backstop 452 are formed, similar to the backstops described above. As illustrated at FIGS. 4A and 4B, the first backstop 450 includes a plurality of cables or shrouds, including a first plurality of longitudinal shrouds 451, running longitudinally between the tips of each of the base members and the telescoping members of the first lower support arm 412 and the first upper support arm 418. Interconnecting each of the first plurality of longitudinal shrouds 451 is a first plurality of diagonal shrouds 453, running from an innermost longitudinal shroud 492 connected to the respective base members to an outermost longitudinal shroud 493 connected to the respective outermost telescoping members. In similar fashion, the second backstop 452 comprises a second plurality of longitudinal shrouds 455 interconnected by a second plurality of diagonal shrouds 457. As illustrated at FIG. 4A, the first backstop 450 and the second backstop 452, in a fully deployed position, provide a vertical extension 481 and a lateral extension 482 that, in various embodiments, may be greater in length than other more conventional backstops, thereby providing forward-facing surfaces having greater surface areas with which to safely arrest the rearward motion of an occupant's arms.

Figure 5:
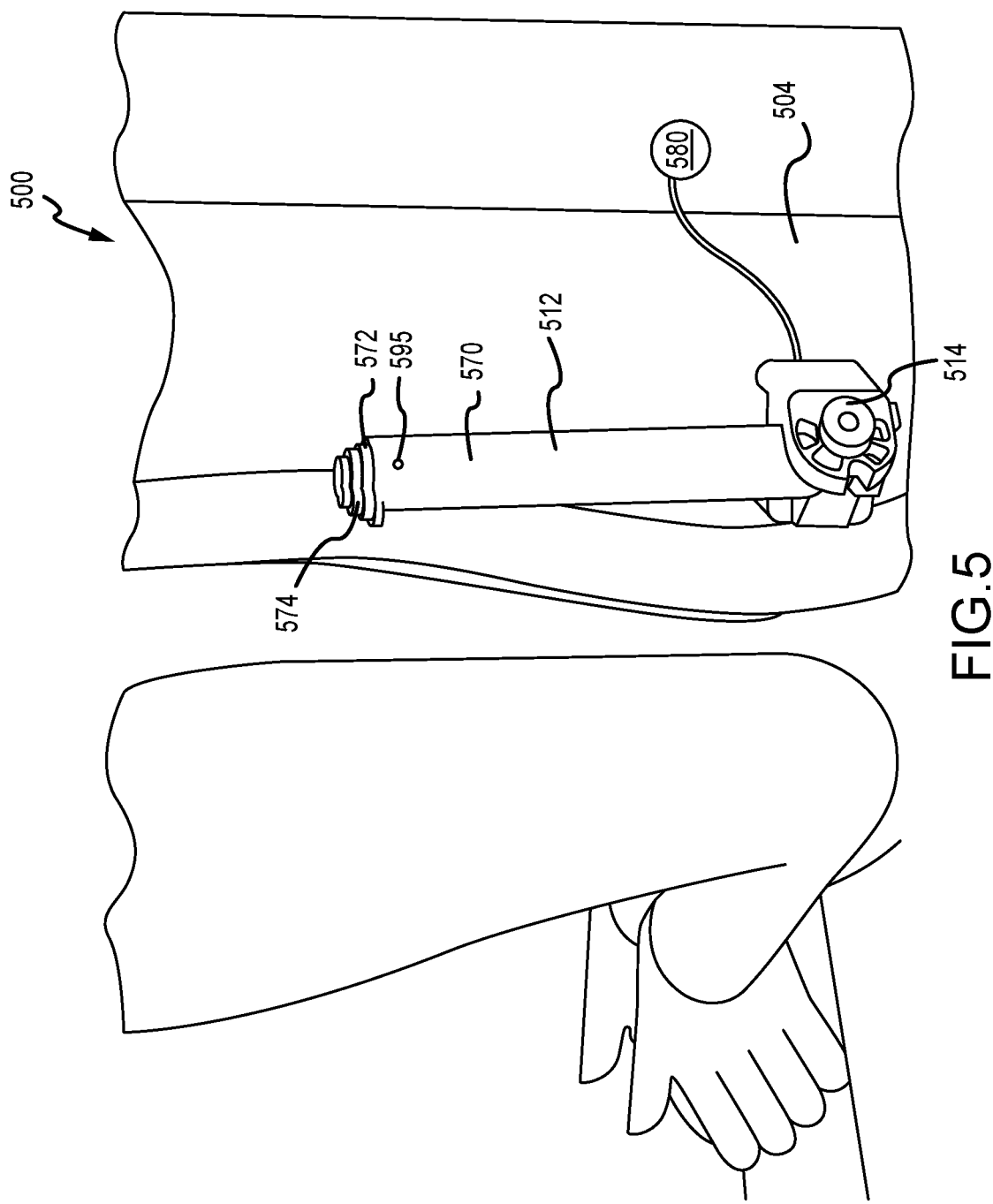
FIG. 5 provides a schematic view of an ejection seat having a telescoping arm restraint system, in accordance with various embodiments.

Referring now to FIG. 5, a portion of an ejection seat 500, similar to the ejection seat 300 and the ejection seat 400 described above, is illustrated. The ejection seat 500 includes a lower support arm 512, illustrated in a retracted position and connected to a ratcheting hinge 514, which itself is connected to a seat frame 504. Similar to the embodiments above described, the lower support arm 512 includes a base member 570 connected to the ratcheting hinge 514, a first telescoping member 572 slidably engaged with the base member 570 and a second telescoping member 574 slidably engaged with the first telescoping member 572. As described above, upon deployment, a pressure source 580, which may be disposed internal or external to the ejection seat 500, is activated to pressurize the lower support arm 512, thereby causing the first telescoping member 572 to slide (or telescope) outwardly from the base member 570 and the second telescoping member 574 to slide (or telescope) outwardly from the first telescoping member 572. Prior to deployment, a shear pin 595 (e.g., a first shear pin) extends through each of the base member 570, the first telescoping member 572 and the second telescoping member 574. The shear pin 595 is configured to prevent any of the telescoping members from telescoping with respect to one another or the base member prior to deployment. Upon activation of the pressure source 580, the shear pin 595 shears under the load of the pressurization of the lower support arm 512, thereby allowing the lower support arm 512 to telescope to its fully deployed position. Similar shear pins (e.g., a second shear pin, a third shear pin and a fourth shear pin) are included in each of the other upper and lower support arms described above in the various embodiments.

The above disclosure provides an ejection seat that affords increased safety for pilots during the extreme loadings experienced in the windblast phase of a thru-canopy ejection. The upper and lower support arms of the telescoping arm restraint system provides further extension, both laterally and vertically, than conventional non-telescoping support arms. This results in a more effective arm restraint in scenarios where arms flail outward at shoulder height, or upward, above shoulder height. Further, the telescoping arms retract (e.g., within respective base members) and require less space prior to deployment and when the ejection seat is installed in the aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An ejection seat, comprising:
   a seat frame having a seat-back and a seat-pan adapted to support an occupant, the ejection seat further comprising a propulsion system configured to propel the ejection seat from an aircraft; and
   a backstop configured to deploy laterally outward from the seat-back to form a forward-facing surface, the backstop including a lower support arm and an upper support arm, the lower support arm and the upper support arm configured to telescope in response to deployment of the ejection seat.

2. The ejection seat of claim 1, wherein the lower support arm includes a lower base member connected to the seat frame.

3. The ejection seat of claim 2, wherein the lower support arm includes a first lower telescoping member slidably engaged with the lower base member.

4. The ejection seat of claim 3, wherein the lower support arm includes a second lower telescoping member slidably engaged with the first lower telescoping member.

5. The ejection seat of claim 3, wherein the lower support arm includes a shear pin extending through the lower base member and the first lower telescoping member.

6. The ejection seat of claim 3, further comprising a ratcheting hinge connecting the lower base member to the seat frame.

7. The ejection seat of claim 3, further comprising a pressure source, the pressure source configured to telescope the first lower telescoping member from the lower base member in response to deployment of the ejection seat.

8. The ejection seat of claim 6, wherein the upper support arm includes an upper base member connected to the seat frame.

9. The ejection seat of claim 8, wherein the upper support arm includes a first upper telescoping member slidably engaged with the upper base member.

10. The ejection seat of claim 9, wherein the upper support arm includes a second upper telescoping member slidably engaged with the first upper telescoping member.

11. The ejection seat of claim 10, further comprising a non-ratcheting hinge connecting the upper base member to the seat frame.

12. An ejection seat for an aircraft, comprising:
    a seat frame having a seat-back and a seat-pan adapted to support an occupant; and
    a backstop configured to deploy laterally outward from the seat-back to form a forward-facing surface, the backstop including
      a lower support arm, the lower support arm configured to telescope in response to deployment of the ejection seat,
      an upper support arm, the upper support arm configured to telescope in response to deployment of the ejection seat, and
      a plurality of shrouds, the plurality of shrouds connected to the lower support arm and the upper support arm and configured to form the forward-facing surface in response to deployment of the ejection seat.

13. The ejection seat of claim 12, wherein the lower support arm includes a lower base member connected to the seat frame and a first lower telescoping member slidably engaged with the lower base member.

14. The ejection seat of claim 13, wherein the plurality of shrouds in connected to the first lower telescoping member.

15. The ejection seat of claim 13, wherein the lower support arm includes a second lower telescoping member slidably engaged with the first lower telescoping member.

16. The ejection seat of claim 15, wherein the plurality of shrouds in connected to the second lower telescoping member.

17. The ejection seat of claim 13, wherein the upper support arm includes an upper base member connected to the seat frame and a first upper telescoping member slidably engaged with the upper base member.

18. The ejection seat of claim 17, wherein the plurality of shrouds is connected to the first lower telescoping member and to the first upper telescoping member.

19. The ejection seat of claim 17, wherein the upper support arm includes a second upper telescoping member slidably engaged with the first upper telescoping member and the lower support arm includes a second lower telescoping member slidably engaged with the first lower telescoping member and wherein the plurality of shrouds is connected to the second lower telescoping member and to the second upper telescoping member.

20. The ejection seat of claim 17, wherein the lower support arm includes a first shear pin extending through the lower base member and the first lower telescoping member and the upper support arm includes a second shear pin extending through the lower base member and the first lower telescoping member.

* * * * *